United States Patent [19]

Luria

[11] Patent Number: 5,314,143
[45] Date of Patent: May 24, 1994

[54] AIRCRAFT CABIN CONSTRUCTION

[75] Inventor: David Luria, Tel Aviv, Israel

[73] Assignee: Fuselage Engineering Services Ltd., Tel-Aviv, Israel

[21] Appl. No.: 59,716

[22] Filed: May 12, 1993

Related U.S. Application Data

[63] Continuation of Ser. No. 812,461, Dec. 23, 1991, abandoned.

[30] Foreign Application Priority Data

Dec. 27, 1990 [IL] Israel ........................................ 96799

[51] Int. Cl.⁵ ............................................ B64D 11/04
[52] U.S. Cl. ................................ 244/118.1; 244/118.5;
 198/465.1; 104/88; 187/24
[58] Field of Search ................ 244/118.1, 118.5, 118.6,
 244/137.1, 137.2; 198/465.1, 465.2; 104/88;
 187/24

[56] References Cited

U.S. PATENT DOCUMENTS

| | | | |
|---|---|---|---|
| 2,635,555 | 4/1953 | Hannsson | 104/88 |
| 3,517,899 | 6/1970 | Vernon | 244/118.5 |
| 3,530,825 | 9/1970 | Antonissen | 104/88 |
| 3,642,158 | 2/1972 | Koennecke et al. | 198/465.1 |
| 3,768,628 | 10/1973 | Bross | 182/24 |
| 3,851,593 | 12/1974 | Gagnon et al. | 104/88 |
| 4,022,404 | 5/1977 | Greiss | 244/118.5 |
| 4,287,967 | 9/1981 | Perkins | 187/24 |
| 4,470,742 | 9/1984 | Schindler | 198/465.1 |
| 4,513,854 | 4/1985 | Prodel et al. | 198/465.1 |
| 4,564,100 | 1/1986 | Moon | 198/465.1 |
| 4,648,570 | 3/1987 | Abdelmaseh | 244/118.1 |
| 4,660,787 | 4/1987 | Sprenger et al. | 244/118.5 |
| 5,044,486 | 9/1991 | Kitamura | 198/465.1 |
| 5,074,496 | 12/1991 | Rezag et al. | 244/118.5 |
| 5,083,727 | 12/1992 | Pompei et al. | 214/118.5 |

*Primary Examiner*—Galen L. Barefoot
*Attorney, Agent, or Firm*—Benjamin J. Barish

[57] ABSTRACT

An aircraft cabin construction includes a cart-storage compartment in the space between the ceiling of the passenger compartment and the upper fuselage wall for storing food-serving wheeled carts; and an elevator having a platform and a drive for lowering the carts from the cart-storage compartment to the deck of the passenger compartment, and for raising the carts from the deck to the cart-storage compartment.

12 Claims, 7 Drawing Sheets

AIRCRAFT CABIN CONSTRUCTION

This application is a continuation of application Ser. No. 07/812,461, filed Dec. 23, 1991, now abandoned.

FIELD AND BACKGROUND OF THE INVENTION

The present invention relates to an aircraft cabin construction, and particularly to a passenger aircraft construction which efficiently exploits the space within the aircraft such as to enable the cabin to accommodate additional passenger seats.

The operating revenue of a passenger aircraft depends to a large extent on the seating capacity of its cabin. Many proposals have been made in order to maximize the use of floor space in the passenger cabin of the aircraft to increase the seating capacity and thereby to increase operating revenue.

As one example for increasing seating capacity, U.S. Pat. No. 3,517,899 proposes to dispose all or a portion of the galley in the lower cargo deck of a two-deck aircraft. However, such a construction, while possibly increasing passenger seating, decreases cargo space and therefore decreases cargo revenue.

Another proposed arrangement, as described in U.S. Pat. No. 4,022,404, discloses a construction wherein an upper deck galley is located in the aft portion of the upper lobe of a three-deck aircraft. However, such an arrangement takes up space which could otherwise be used for passenger seats or as a resting cabin for the crew.

A further construction, proposed in U.S. Pat. No. 4,055,317, locates the galley adjacent an aft pressure bulkhead defining a concave recess in the rearward direction, but such an arrangement also requires significant modifications in the construction of the aircraft fuselage; in addition it takes up space which could be used, e.g., toilets.

In a still further arrangement, described in U.S. Pat. No. 4,660,787, a pantry is located on the upper deck of a two-deck aircraft, and the food supply carts are supported on a platform arranged on the lower deck, which platform is lifted by a lifting mechanism to the pantry on the upper deck. Such an arrangement, however, utilizes the lower deck for storing the food supply carts, and therefore decreases the available cargo capacity.

Other examples of attempts to exploit the upper space of the fuselage are described in U.S. Pat. Nos. 4,066,227 and 4,925,132.

OBJECTS AND BRIEF SUMMARY OF THE INVENTION

An object of the present invention is to provide an aircraft cabin construction having advantages in the above respects. More particularly, an object of the present invention is to provide an aircraft cabin construction which maximizes the available seating capacity of the aircraft by exploiting unused space in the upper fuselage wall, while minimizing the structural changes required to be made in the aircraft, and also enabling the use of conventional carts.

According to the present invention, there is provided an aircraft cabin construction comprising an outer fuselage wall enclosing a passenger compartment including a ceiling spaced below the outer fuselage wall, a deck below the ceiling, and a plurality of passenger seats fixed to the deck under the ceiling; characterized in that the cabin construction further includes: a storage compartment in the space between the outer fuselage wall and the ceiling for storing article holders; and an elevator having a platform and a drive for loading the article holders from the storage compartment to the deck, and for raising the article holders from the deck to the storage compartment.

According to one described embodiment, the passenger compartment further includes toilet facilities, the ceiling includes a section overlying the passenger seats and a section overlying the toilet facilities, and the storage compartment occupies space between the outer fuselage wall and the ceiling section overlying the toilet facilities. More particularly, in that described embodiment, the passenger compartment further includes a longitudinally-extending main aisle and an entrance/exit aisle extending transversely from the main aisle to a cabin door, the ceiling also includes a section overlying the entrance/exit aisle, and the storage compartment also occupies space between the outer fuselage wall and the ceiling section overlying the entrance/exit aisle.

According to a second described embodiment, the storage compartment occupies the space extending along the longitudinal axis of the aircraft cabin between the outer fuselage wall and the ceiling.

In both described embodiments, the storage compartment is dimensioned to support a plurality of rows of article holders, each row including a plurality of article holders. The elevator platform is aligned with one of the rows; and the storage compartment further includes conveyor means for conveying an article holder from its location in the storage compartment to the elevator platform. In addition, the article holders are in the form of wheeled carts.

An aircraft cabin constructed in accordance with the foregoing features makes a significant amount of additional space on the deck available for passenger seating thereby enabling the operating revenues to be increased, while at the same time it minimizes the structural changes required in the aircraft cabin construction such that existing aircraft can be easily modified to accommodate this additional seating.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

The aircraft cabin construction illustrated in FIGS. 1-9 of the drawings is designed particularly for aircraft having a relatively large number of passenger seats and therefore required to accommodate a relatively large number of wheeled carts in order to supply the passengers with food and drink. In the illustrated construction, as will be described more particularly below, the number of passenger seats is maximized by providing a cart-storage compartment in the space between the top of the toilet compartments and the top wall of the aircraft fuselage for storing the food-serving carts. If additional space is required, the cart-storage compartment may also include the space between the top of the pantry and the top fuselage wall, and if still additional space is required, it may also include the space over a transverse entrance/exit aisles leading from a cabin door to the longitudinal aisles between the seats of the aircraft. The cart-storage compartment is served by an elevator which includes a platform and a drive for lowering the carts from the cart-storage compartment to the passenger deck, and for raising the carts from the passenger deck to the cart-storage compartment.

Figure 1:
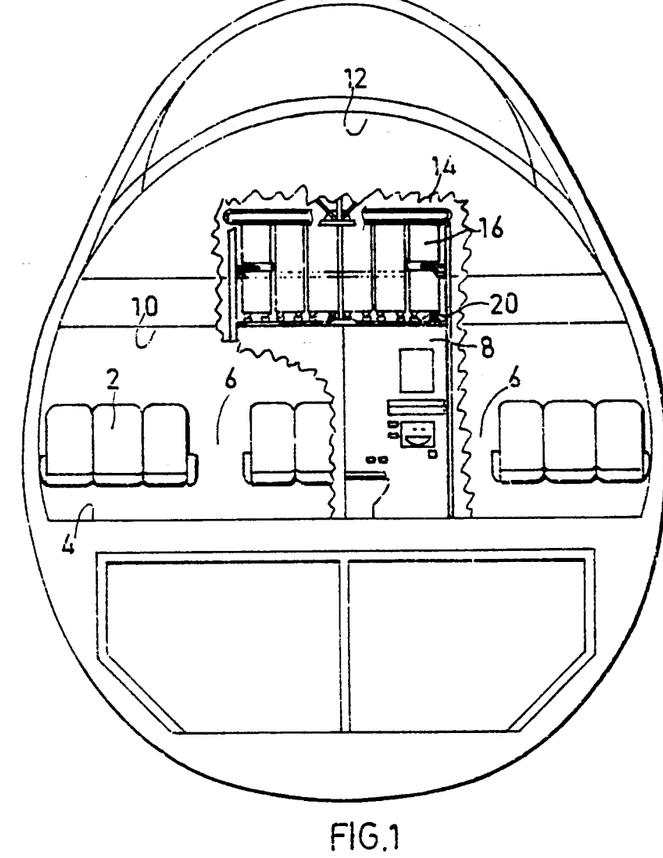
FIG. 1 is a front view, partly broken away, diagrammatically illustrating one form of aircraft cabin construction in accordance with the present invention.
Figure 2:
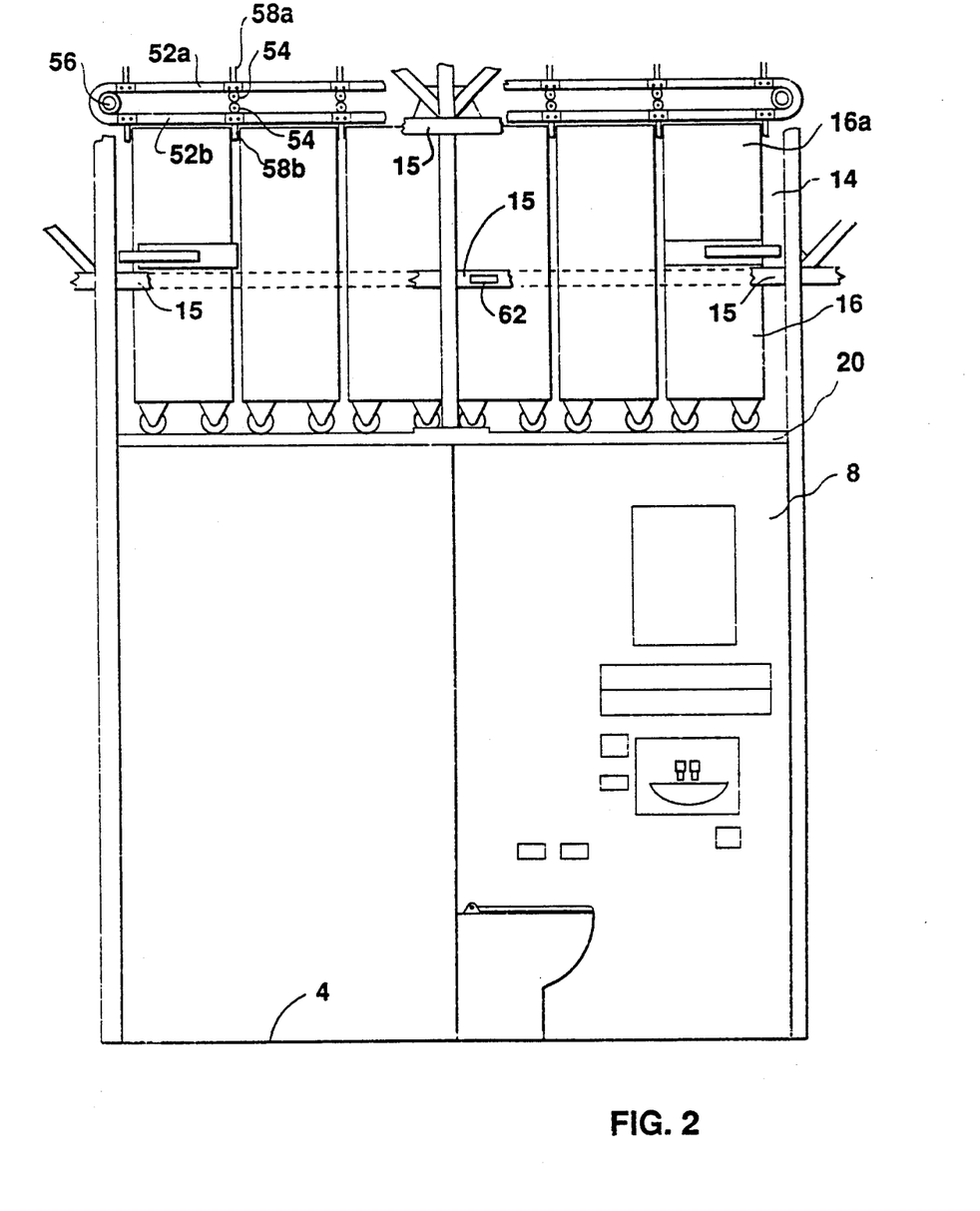
FIG. 2 is a side elevational view of the cabin construction of FIG. 1.

More particularly, as shown in FIG. 1, the aircraft cabin structure includes a plurality of passenger seats 2 fixed to the passenger deck 4 and separated by one or more longitudinally-extending aisles 6 to provide access to the passenger seats. The aircraft cabin further includes one or more toilet compartments 8. Such cabin constructions generally include a false ceiling 10 defining the upper end of the passenger compartment and the toilet compartment but usually spaced well below the upper wall 12 of the fuselage. It is this space between the false ceiling 10 and the upper wall 12 of the fuselage, particularly above the toilet compartments 8, which is used as a storage compartment 14 for the wheeled food-serving carts, generally designated 16. Storage compartment 14 may also occupy the space above the top of the pantry, shown at 18 in FIG. 3, and/or above the entrance/exit aisles 19 extending transversely of the cabin section from the cabin doors to the longitudinal aisle 6.

The deck 20 of the cart-storage compartment 14 is supported by a plurality of inner vertical posts 22 (FIG. 3) extending on opposite sides of the longitudinal aisle 6 and the inner side of the toilet compartments 8 and the pantry 18, and a plurality of outer posts 23 at the outer sides of the toilet compartment 8 and pantry 18. The inner posts 22 may also be used for accommodating the elevator platform, shown at 24, and its drive for transporting the carts from the storage compartment 14 to the passenger deck 4, and vice versa.

Figure 3:
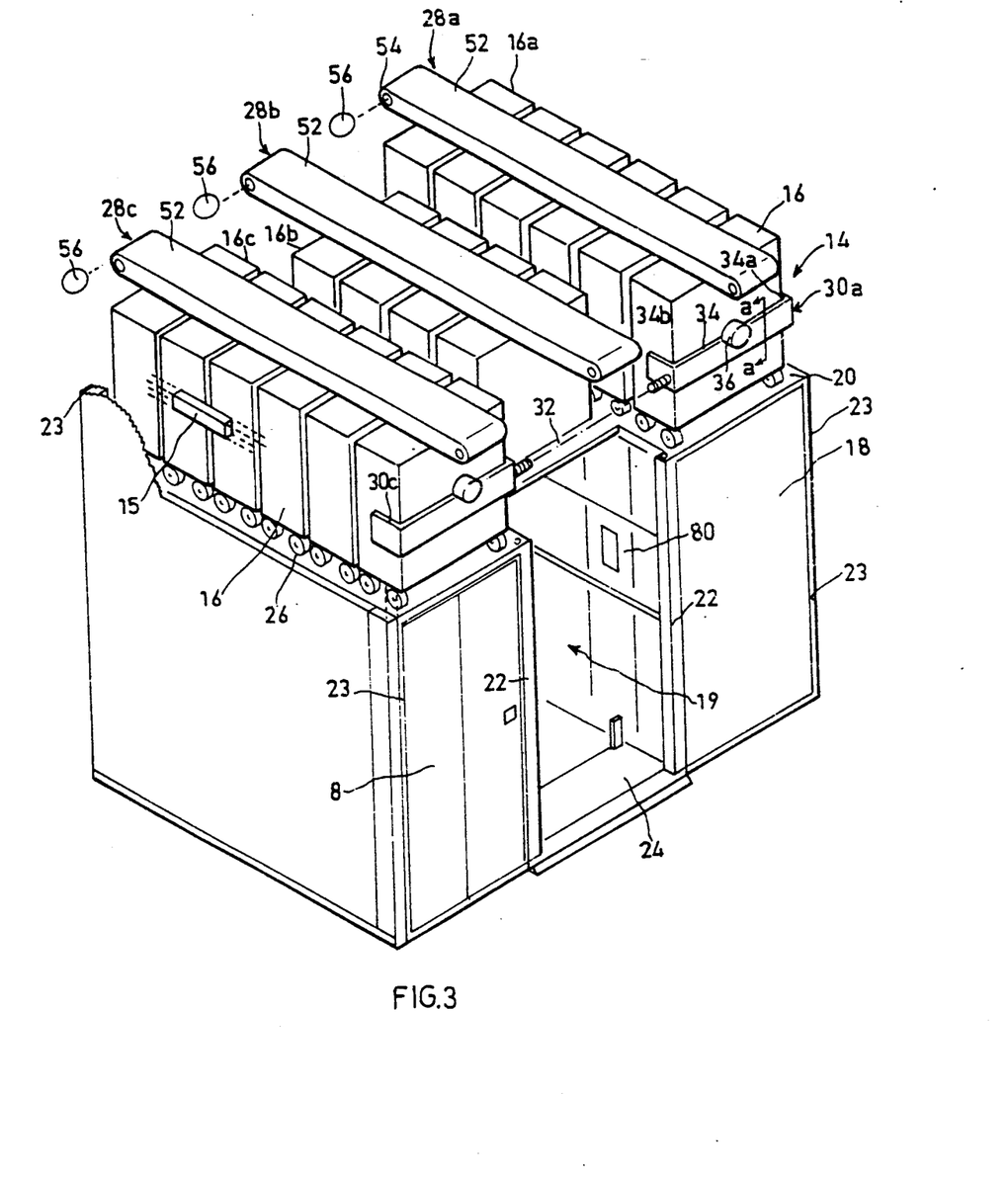
FIG. 3 is a three-dimensional view of the cabin construction illustrated in FIGS. 1 and 2.
Figure 4:
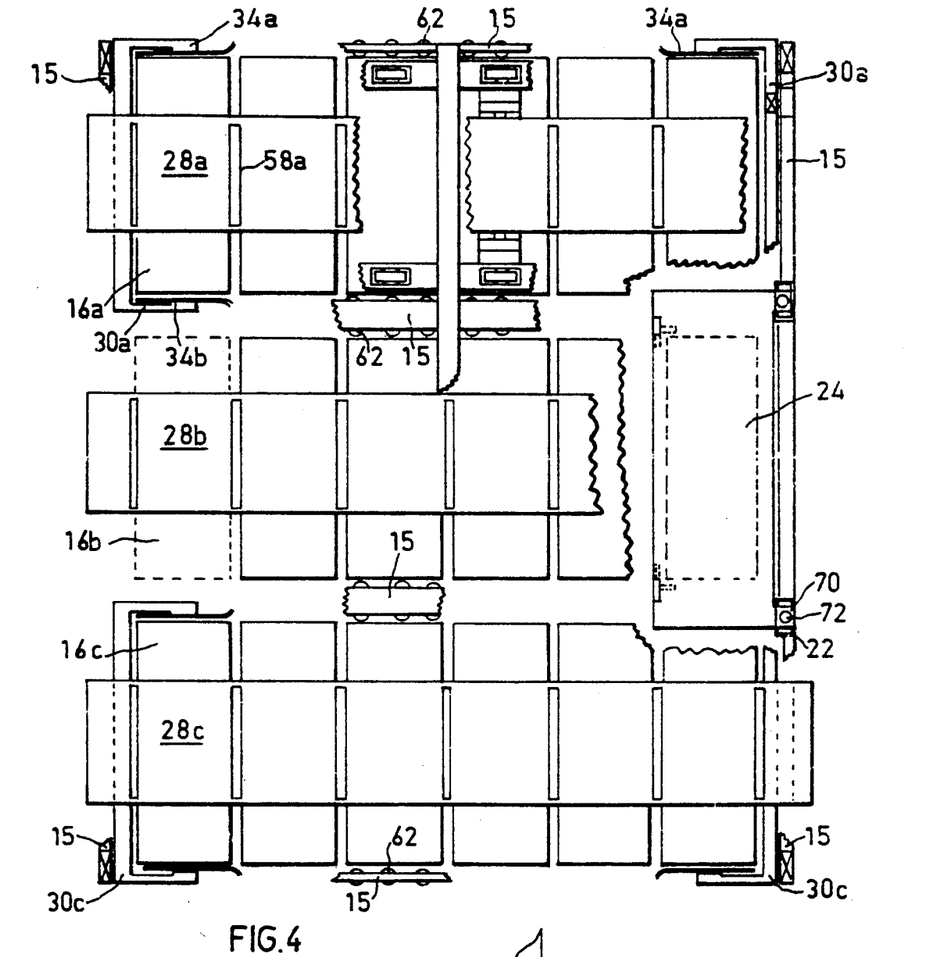
FIG. 4 is a top plan view of FIG. 3.
Figure 5:
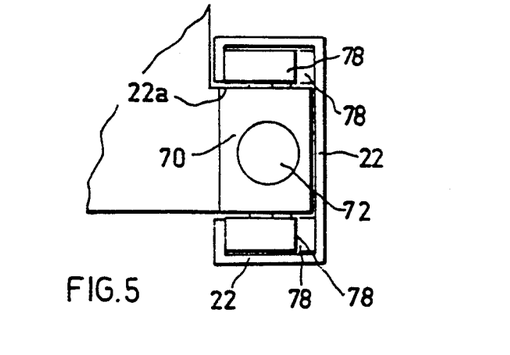
FIG. 5 is an enlarged fragmentary view illustrating a part of FIG. 4.

As shown particularly in FIGS. 3 and 4, the storage compartment 14 is constructed of a plurality of frames 15 (FIGS. 3, 4, 6) to accommodate a plurality of rows of food-serving carts 16 with each row including a plurality of such carts. In the example illustrated, there are three rows of carts 16a, 16b, 16c, with six carts in each row, except that the middle row has two carts less in order to accommodate two elevator platforms 24, only one of which is shown in FIG. 4. Each of the carts 16 is supported by four wheels or castors 26 swivally mounted on rotary bearings 26a (e.g., FIG. 6) enabling the wheels to turn in any direction. Thus, each cart can be moved either in the direction along its respective row, or transversely of its respective row, in order to move the cart to the space occupied by the elevator platform 24, whereupon the elevator platform may lower the cart to the passenger deck 4.

Frame 15 of the cart storage compartment 14 includes a conveyor belt 28a, 28b, 28c, for each row 16a, 16b, 16c of the carts 16 and aligned with its respective row, for conveying each cart along its respective row. Compartment 14 includes a second conveyor 30a, 30c, for each side of the two outer rows of carts 16a, 16c, which conveys the end cart in the respective row transversely of its frame to the elevator platform 24 aligned with the middle row of carts 16b whenever it is desired to lower the cart from rows 16a, 16c to the passenger deck 4. The two transverse conveyors 30a, 30c cooperate with a screw 32 extending transversely across the compartment in alignment with the elevator platform 24.

Figure 3A:
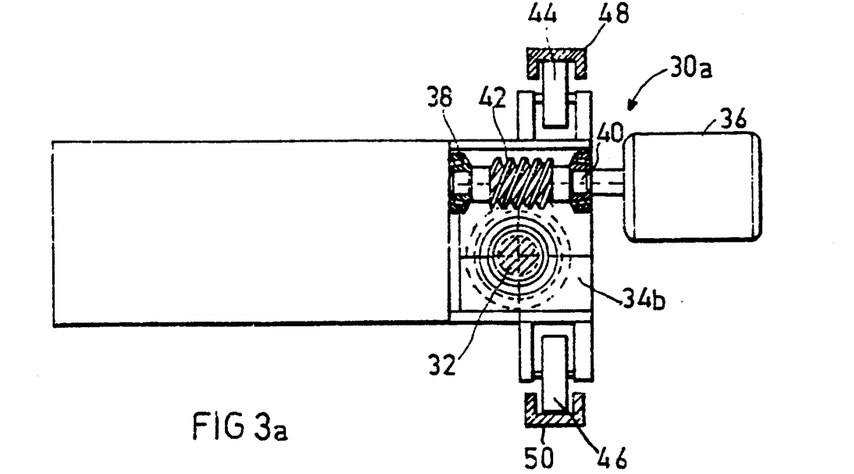
FIG. 3a is an enlarged view along line a--a of FIG. 3.

The construction of transverse conveyor 30a is more particularly illustrated in FIG. 3a, it being understood that transverse conveyor 30c is of the same construction.

Thus, as shown in FIGS. 3 and 3a, transverse conveyor 30a includes a U-shaped conveyor member 34 of a length slightly longer than the length of a cart 16 and having a pair of inturned ends 34a, 34b straddling the opposite ends of the cart. Screw 32 fixed to frame 15 passes through openings formed in the two inturned ends 34a, 34b. Conveyor member 34 carries an electric motor 36 and a pair of bearings 38, 40 for supporting the motor drive shaft, which shaft includes a gear 42 meshing with screw 32. Thus, the energization of motor 36 rotates its gear 42 which, meshing with screw 32, moves conveyor member 34, and thereby the cart straddled between its two ends 34a, 34b, towards or away from the elevator platform 24 according to the direction of rotation of motor 36. The movement of conveyor member 34, and thereby of the cart 16 straddled between its two ends 34a, 34b, is guided by a pair of end rollers 44, 46 received in fixed tracks 48, 50.

Figure 6:
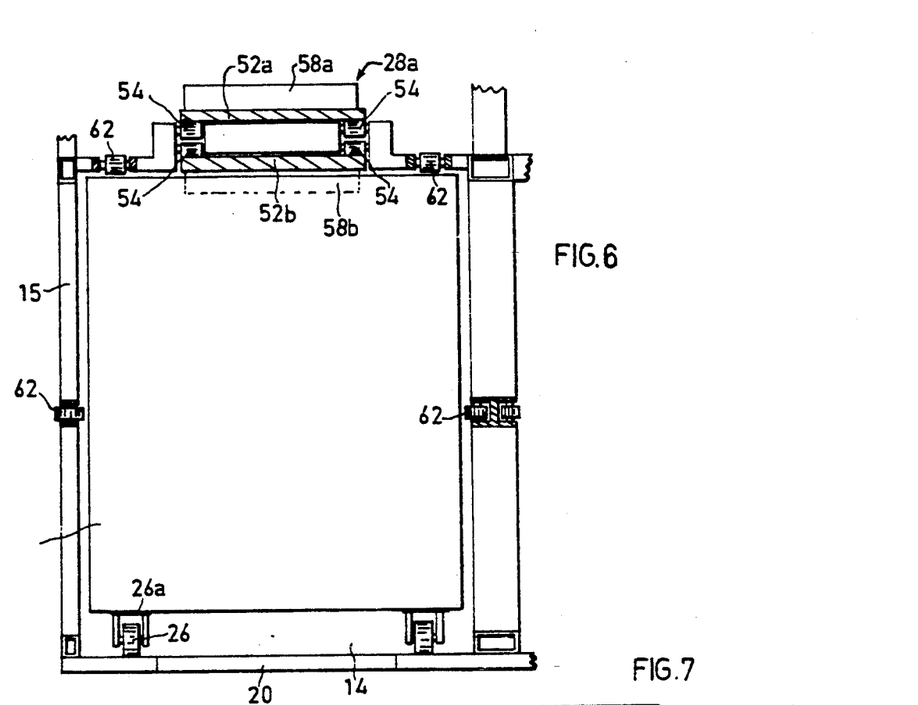
FIG. 6 is an end view, partly in section, illustrating the portion of the cart-storage compartment of FIGS. 1–4 for one row of the food-serving carts.

The construction of each of the longitudinal conveyors 28a-28c, aligned with each of the three row of carts 16a-16c, respectively, is more particularly illustrated in FIGS. 3, 4 and 6 showing the construction of conveyor 28a. Thus, conveyor 28a includes a closed-loop belt 52 having an upper stretch 52a and a lower stretch 52b supported in spaced relation by end rollers 54. One pair of end rollers 54 are driven by a motor 56 (FIG. 3). Both stretches 52a, 52b of the conveyor belt include a plurality of pusher members 58a, 58b (FIG. 6) spaced apart such that each cart 16 is straddled by a pair of such pusher members. Thus, when motor 56 for one of the belts 52 is energized to move the conveyor belt, the pusher members push each cart towards the end of compartment 14 occupied by the elevator platform 24, or away from that end of the compartment, according to the direction of rotation of the motor 56.

Each of the rows of carts 16a–16c is movable within its longitudinally-extending frame 15. The frames are of an open rectangular configuration slightly larger than the outer dimensions of the carts. The top wall and the two side walls of frame 15 is provided with a plurality of rollers 62, as shown particularly in FIG. 6, to permit free movement of the carts within the frame when the respective longitudinal conveyor 28a–28c is energized. The carts are thus moved by the pusher members 58a, 58b and roll along the deck 20 on their own wheels 26. As indicated earlier, the wheels are provided with the swivel mountings 26a (FIG. 6) to permit the carts to move in any direction, i.e., longitudinally by conveyors 28a–28c, or transversely by conveyors 30a, 30c.

It will thus be seen that in the construction illustrated in FIG. 6, the carts are supported on their own wheels 26 on deck 20 of the storage compartment 14.

Figure 7:
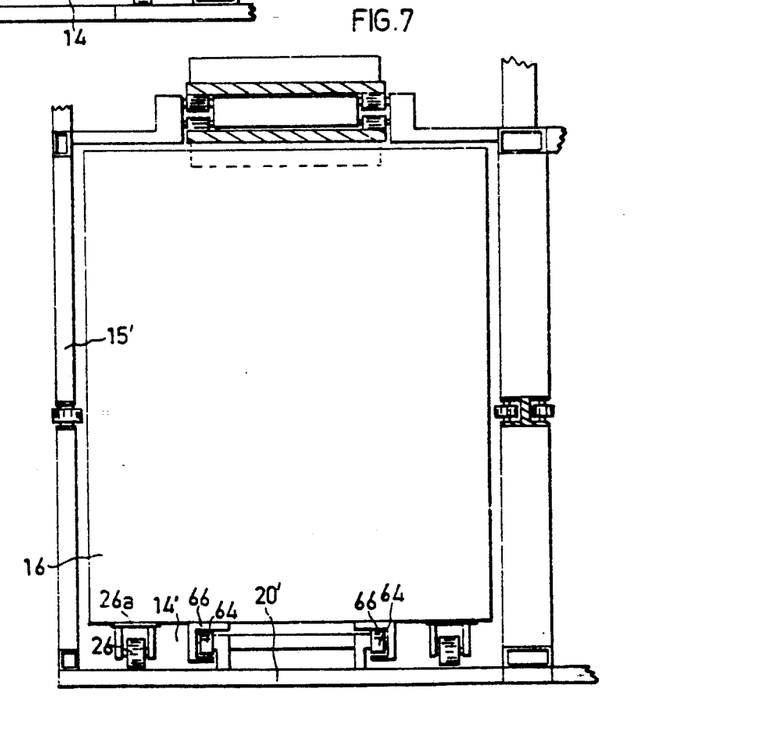
FIG. 7 is a view similar to that of FIG. 6 but illustrating a modification in the construction of the cart-storage compartment and one of the carts stored therein.

FIG. 7 illustrates a variation wherein, when the carts are in the storage compartment therein designated 14', they are not supported on their own wheels 26, but rather on rollers 64 mounted on the storage department deck 10' and receivable within tracks 66 secured to the bottoms of the carts 16. The rollers 64 and tracks 66 thus permit each cart to be advanced in the longitudinal direction by the longitudinal conveyors 28a–28c, with the cart wheels 26 supported slightly above the storage compartment deck 20', until the cart arrives at the end position of the respective row. At that time the cart is supported on its own wheels 26 to enable the transverse conveyors 30a, 30b to convey the cart towards (or away from) the elevator platform 24.

The construction of the frames 15' in the variation of FIG. 7, and also of the longitudinal conveyor 28a–28c for moving the carts in the longitudinal direction, is otherwise the same as described above with repect to FIG. 6.

Figures 8, 9:
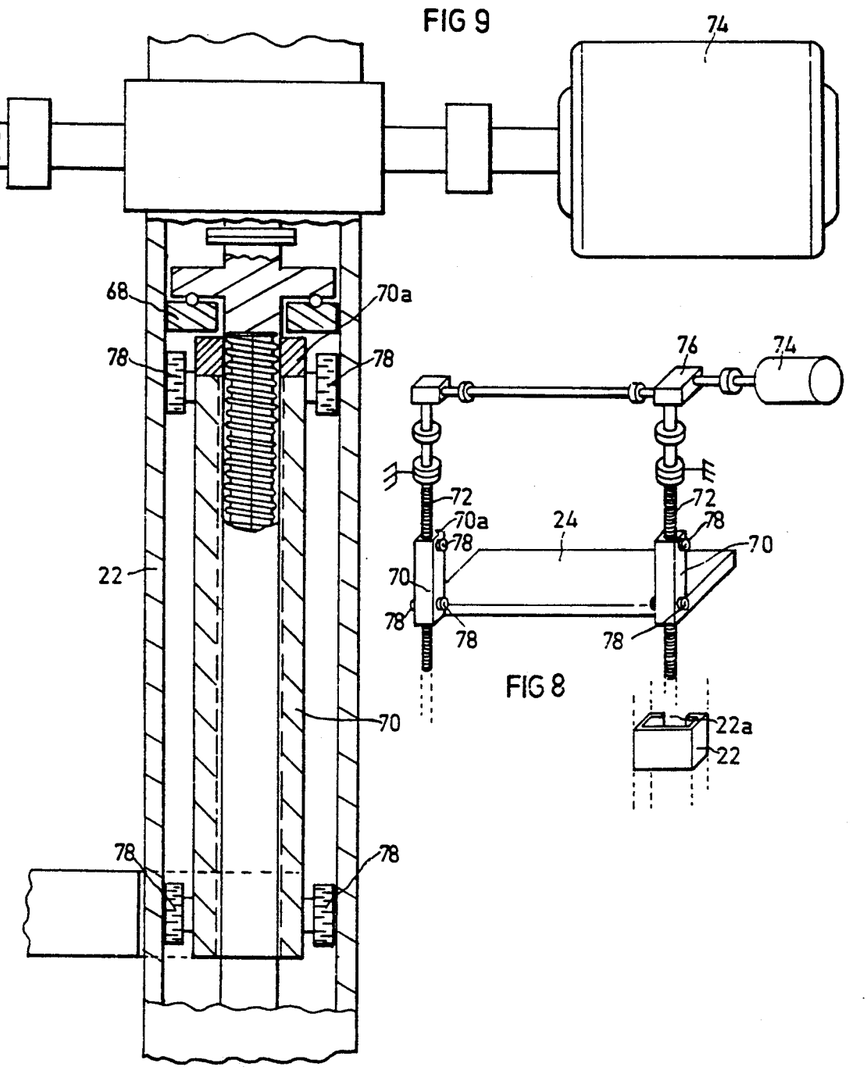
FIG. 8 illustrates the elevator for lowering the carts from the cart-storage compartment to the passenger deck, and for raising the carts from the passenger deck to the cart-storage compartment.
FIG. 9 is a fragmentary view, partly in section, more particularly illustrating the drive for the elevator in FIG. 8.

The elevator platform 24 lowers the carts 16 from the storage compartment 14 to the passenger deck 4, or raises them from the passenger deck to the storage department. As particularly illustrated in FIGS. 8 and 9, elevator platform 24 is supported at its opposite ends by a bearing 68 and is moved by a pair of sleeves 70 having threaded openings in their end walls 70a threadedly receiving screws 72, such that the rotation of the screws raises or lowers the elevator platform 24, according to the direction of rotation. The two screws 72 are synchronously rotated by motor 74 coupled to them via gear boxes 76. The sleeves 70 are of rectangular section and are received within the vertical posts 22 (FIG. 3) on the opposite sides of the aisle 10 supporting the storage compartment deck 20. These posts 22 are formed with an opening 22a, as shown in FIG. 8, to accommodate the connections of the sleeves 70 to the elevator platform 24. Sleeves 70 are further provided with external rollers 78 engageable with the inner faces of the vertical posts 22 to guide the movement of the sleeves within the vertical posts as the screws 72 are rotated by motor 74.

It will thus be seen that the carts 16 are normally stored in the cart storage compartment 14 overlying the toilet compartments 8, and optionally also overlying the pantry 18, and/or the transverse entrance/exit aisles adjacent the cabin doors, depending on the storage space required. When the carts are to be used for serving food, they may be individually conveyed to the elevator platform 24 by the longitudinal conveyors 28a–28c and by the transverse conveyors 30a, 30c, and then lowered by the elevator platform to the passenger deck 4. After the serving of the food has been completed, the trash may be collected in the carts and then moved to the elevator platform 24, where they may be raised by the elevator to the cart storage compartment 14 overlying the toilet compartments 8, pantry 18, etc.

The foregoing movements of the carts from the storage compartment to the passenger deck, or from the passenger deck back to the storage compartments, may be controlled automatically by a computer, having a control panel, e.g., as shown at 80 in FIG. 3, mounted in the portion of the aisle 10.

It will thus be seen that an aircraft cabin constructed in accordance with the foregoing features permits the food-serving carts 16 to be stored in a location not otherwise used, and thereby increases the area of the passenger deck 4 that may be provided with passenger seats. In addition, this permitted increase in passenger seating may be effected with a minimum modification in the structure of the aircraft cabin.

Figure 10:
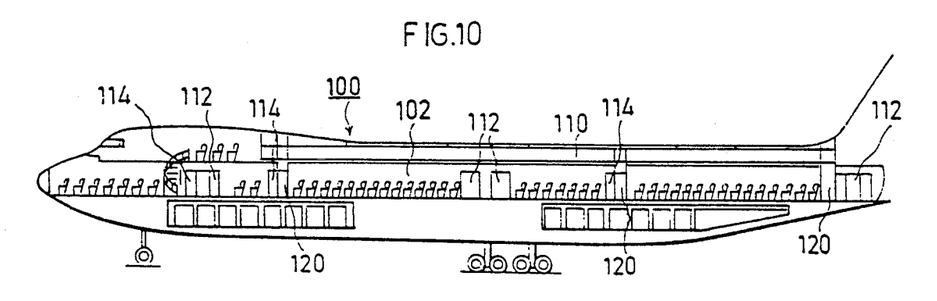
FIG. 10 is a longitudinal sectional view illustrating another form of aircraft cabin construction in accordance with the present invention.
Figure 11:
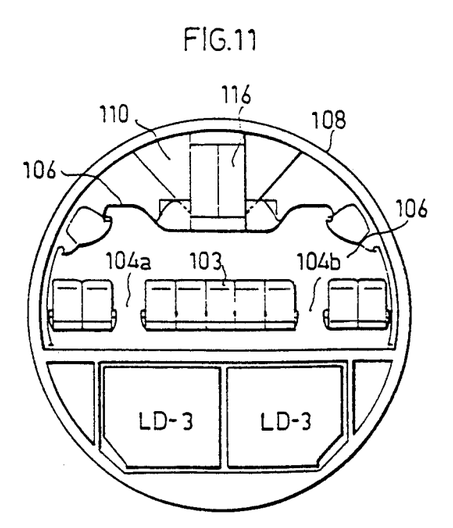
FIG. 11 is an enlarged transverse sectional view of the cabin construction of FIG. 10.

FIGS. 10 and 11 illustrate another aircraft fuselage construction, generally designated 100, in accordance with the present invention. In this construction, the aircraft includes a main passenger compartment 102 extending longitudinally of the aircraft for a major portion of the length of the aircraft and having seats 103 defining two longitudinally-extending aisles 104a, 104b, as well as a plurality of transversely-extending entrance/exit aisles (not shown). The passenger compartment includes a ceiling 106 which is spaced from the outer fuselage wall 108 to define a longitudinally-extending space 110 between them. The illustrated aircraft further includes lavatories 112 and galleys 114 also covered by ceiling 106 and spaced from the outer fuselage wall 108.

The longitudinally-extending space 110 is used as the cart-storage compartment for storing the food-serving wheeled carts 116. This compartment is serviced by a plurality of elevators 120 (three being seen in FIG. 10) located at longitudinally spaced locations along its length. It may extend for the complete length of the passenger compartment of the aircraft or for only a part of its length. The elevators, cart storage compartments, and carts may be otherwise constructed as described above.

It will be seen that in the construction illustrated in FIGS. 10 and 11, the cart-storage compartment is located longitudinally of the aircraft centrally of the space 110 between the outer fuselage wall 108 and the ceiling 106, rather than transversely over the transverse entrance/exit aisles and/or above the lavatories, such a construction provides a number of advantages: It permits loading and unloading of food and the food carts from the end of the aircraft, and therefore does not interfere with passengers boarding or leaving the aircraft from the transverse entrance/exit aisles. It also permits the food and carts to be loaded into or unloaded from the aircraft independently of the passengers, thereby decreasing turnaround time. In addition, it avoids the need for reinforcement of the transverse entrance/exit aisle construction.

While the invention has been described with respect to two preferred embodiments, it will be appreciated that this is set forth for purposes of example only, and that many other variations, modifications and applications of the invention may be made.

What is claimed is:

1. An aircraft cabin construction comprising an outer fuselage wall enclosing a main passenger compartment extending longitudinally of the aircraft for a major portion of the length of the aircraft and including a ceiling spaced below the outer fuselage wall, a deck below said ceiling, and a plurality of passenger seats fixed to said deck under said ceiling;

characterized in that said cabin construction further includes:

a storage compartment extending centrally through the space between said outer fuselage wall and said ceiling for a substantial part of the length of the main passenger compartment for storing article holders;

and a plurality of elevators at longitudinally-spaced locations along the length of said storage compartment, each of said elevators having a platform and a drive for lowering the article holders from said storage compartment to said deck, and for raising the article holders from said deck to said storage compartment.

2. The cabin construction according to claim 1, wherein said passenger compartment further includes toilet facilities;

said ceiling including a section overlying said passenger seats, and a section overlying said toilet facilities;

said storage compartment occupying space between said outer fuselage wall and the ceiling section overlying said toilet facilities.

3. The cabin construction according to claim 1, wherein said passenger compartment further includes a longitudinally-extending main aisle and an entrance/exit aisle extending transversely from the main aisle to a cabin door;

said ceiling also including a section overlying said entrance/exit aisle;

said storage compartment also occupying space between said outer fuselage wall and the ceiling section overlying said entrance/exit aisle.

4. The cabin construction according to claim 1, wherein said storage compartment is dimensioned to support a plurality of rows of article holders, each row including a plurality of article holders; each of said elevator platforms being aligned with one o said rows; said storage compartment further including conveyor means for conveying an article holder from its location in the storage compartment to said elevator platforms.

5. The cabin construction according to claim 1, wherein said storage compartment extends substantially for the complete length of said main passenger compartment, there being at least three elevators at longitudinally-spaced locations along the length of said storage compartment.

6. The cabin construction according to claim 5, wherein said conveyor means includes a first conveyor for conveying a cart in the direction parallel to its row, and a second conveyor for conveying a cart in the direction transversely to its row.

7. The cabin construction according to claim 6, wherein said first conveyor comprises a conveyor belt for each row extending parallel to and over the carts in its row, and a pair of pushing arms for each cart depending below the conveyor belt and adapted to straddle its respective cart for pushing the cart parallel to its respective row.

8. The cabin construction according to claim 6, wherein said second conveyor comprises: a nut, a static screw extending transversely across the cart-storage compartment in alignment with said elevator platform, a motor for rotating said nuts, and a pair of arms adapted to straddle a cart and coupled to said screw such that rotation of the nut moves the pair of arms and the cart straddled thereby to said elevator platform.

9. The cabin construction according to claim 1, wherein each of said elevators includes: a pair of screws mounted at opposite sides of its respective elevator platform, nuts received on said screws and coupled to said elevator platform, and a motor for rotating said screws in one direction to lower the elevator platform, or in the opposite direction to raise the elevator platform.

10. The cabin construction according to claim 9, wherein said screws are received in vertical channels supporting said cart-storage compartment, said nuts including guide rollers engageable with the inner surface of said channels for guiding the movement of said nuts and of the elevator platform coupled thereto.

11. The cabin construction according to claim 4, in combination with a plurality of wheeled food-serving carts normally stored in said cart-storage compartment.

12. The cabin construction according to claim 11, wherein said cart-storage compartment includes rollers, and said carts include tracks carried by their bottoms for receiving the rollers and for supporting the carts with the wheels of the carts spaced from the deck of the cart-storage compartment.

* * * * *